United States Patent
Faber et al.

(10) Patent No.: US 12,086,822 B2
(45) Date of Patent: Sep. 10, 2024

(54) CRISIS-RECOVERY DATA ANALYTICS ENGINE IN A DATA ANALYTICS SYSTEM

(71) Applicant: The Boston Consulting Group, Inc., Boston, MA (US)

(72) Inventors: Vincent Francois Faber, Boston, MA (US); Daniele Gaudenzio Wolfgang Parenti, Marina Del Rey, CA (US); Aaron Dean Arnoldsen, Beaverton, OR (US)

(73) Assignee: THE BOSTON CONSULTING GROUP, INC., Boston, MA (US)

( * ) Notice: Subject to any disclaimer, the term of this patent is extended or adjusted under 35 U.S.C. 154(b) by 121 days.

(21) Appl. No.: 17/747,927

(22) Filed: May 18, 2022

(65) Prior Publication Data
US 2023/0091245 A1    Mar. 23, 2023

Related U.S. Application Data

(60) Provisional application No. 63/234,232, filed on Aug. 17, 2021.

(51) Int. Cl.
*G06Q 30/0204* (2023.01)
*G06N 20/00* (2019.01)

(52) U.S. Cl.
CPC ......... *G06Q 30/0205* (2013.01); *G06N 20/00* (2019.01)

(58) Field of Classification Search
CPC ........... G06N 3/00–20/00; G06Q 10/00–50/00
USPC ............................... 705/7.11–7.42
See application file for complete search history.

(56) References Cited

U.S. PATENT DOCUMENTS

| | | | |
|---|---|---|---|
| 7,165,037 B2 * | 1/2007 | Lazarus | G06Q 30/0269 705/7.31 |
| 10,621,203 B2 * | 4/2020 | Hunt | G06F 16/283 |
| 11,361,202 B2 * | 6/2022 | McCarson | G06V 20/188 |
| 2004/0172374 A1 * | 9/2004 | Forman | G06N 20/00 706/12 |
| 2008/0288889 A1 * | 11/2008 | Hunt | G06Q 30/02 715/810 |
| 2017/0323216 A1 * | 11/2017 | Fano | G06N 20/00 |
| 2018/0225605 A1 * | 8/2018 | Fabara | G06Q 10/0635 |
| 2022/0292239 A1 * | 9/2022 | Kahraman | G06N 20/00 |
| 2022/0318577 A1 * | 10/2022 | McCarson | G06F 18/2133 |

(Continued)

*Primary Examiner* — Alan S Miller
(74) *Attorney, Agent, or Firm* — Fish & Richardson P.C.

(57) ABSTRACT

Methods, systems, and computer storage media for providing a data analytics index associated with a crisis-recovery data analytics engine in a data analytics system. The data analytics index is a consolidated single index representation of a set of variables associated with a set of consumer behaviors. The crisis-recovery data analytics engine supports generating the data analytics index associated with a pre-crisis period and a crisis-recovery period. In operation, a crisis-recovery dataset—associated with a set of variables of a set of consumer behaviors that support quantifying recovery from a crisis event—is accessed. The set of consumer behaviors are selected based on a crisis-recovery machine learning model that is trained on a pre-crisis dataset and a crisis dataset for selecting the set of consumer behaviors. A data analytics index is generated based on the crisis-recovery dataset. A data visualization comprising crisis-recovery data indicating recovery from the crisis event is generated.

20 Claims, 14 Drawing Sheets

(56) References Cited

U.S. PATENT DOCUMENTS

2022/0405775 A1\* 12/2022 Siebel .................... G06Q 30/01
2023/0052612 A1   2/2023 Stoehr et al.

\* cited by examiner

CRISIS-RECOVERY DATA ANALYTICS ENGINE IN A DATA ANALYTICS SYSTEM

CROSS-REFERENCE SECTION

The present application claims the benefit of U.S. Provisional Application No. 63/234,232, filed Aug. 17, 2021 and entitled "Crisis-Recovery Data Analytics Engine In A Data Analytics System", the entirety of which is incorporated by reference herein.

BACKGROUND

Many companies rely on data analytics systems to support discovering useful information, informing conclusions and decision-making based on data. Data analytics systems can support forecasting—such as a forecasting system—that uses historical data as inputs to predict future trends. For example, businesses use forecasting systems to determine how to allocate budgets or plan anticipated expenses for upcoming periods of time. Forecasting systems can also be used for projecting demands for goods and services offered. Machine learning techniques implemented in forecasting systems allow for improving forecasting system operations including accelerating data processing speed, providing a more accurate forecast, automating forecasting updates based on recent data, analyzing more data, identifying hidden patterns in data, creating a more robust system, and increasing adaptability to changes. For example, machine learning techniques can be used to train machine learning models and different types of training data for making predictions based on analyzing trends in the data.

Conventional data analytics systems are not configured with a computing infrastructure and logic for making decisions when there exists volatility in input data. In particular, conventional data analytics systems operate using machine learning models that are trained with stable and consistent data (i.e., non-volatile data). During a crisis period, input data can be inconsistent with training data of conventional data analytics systems, as such, the machine learning models are limited in identifying and using insights to make predictions with data associated with the crisis period. As such, a more comprehensive data analytics systems—having an alternative basis for providing data analytics systems operations—can improve computing operations and interfaces in data analytics systems.

SUMMARY

Various aspects of the technology described herein are generally directed to systems, methods, and computer storage media, for among other things, providing a data analytics index associated with a crisis-recovery data analytics engine in a data analytics system. The data analytics index is a consolidated single index (i.e., a consumer activity index "CAI") representation of a set of consumer behaviors with hierarchical and granular data. The crisis-recovery data analytics engine operates—using crisis-recovery-based machine learning model—to generate the data analytics index that includes input data associated with a pre-crisis period, a crisis period, and a crisis-recovery period.

The data analytics index is generated or derived based on a data driven approach that tracks consumer activity. An index generation engine generates the data analytics index based on index generation operations including identifying a set of consumer behaviors related to a set of variables, tracking the set of consumer behaviors, consolidating the set of consumer behaviors into a single index, and anchoring the data analytics index to a date associated with a crisis. The data analytics index is associated with geographic regions via hierarchy and granularity data, where the variables of the consumer behaviors are associated with mobility change (i.e., mobility data) and spending change (i.e., spending data). In this way, the data analytics index is a consumer activity index that summarizes a unique set of variables into the single index, where the single index is associated with a quantified score that indicates a level of recovery from the crisis.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein.

DETAILED DESCRIPTION OF THE INVENTION

Overview

Figure 1A:
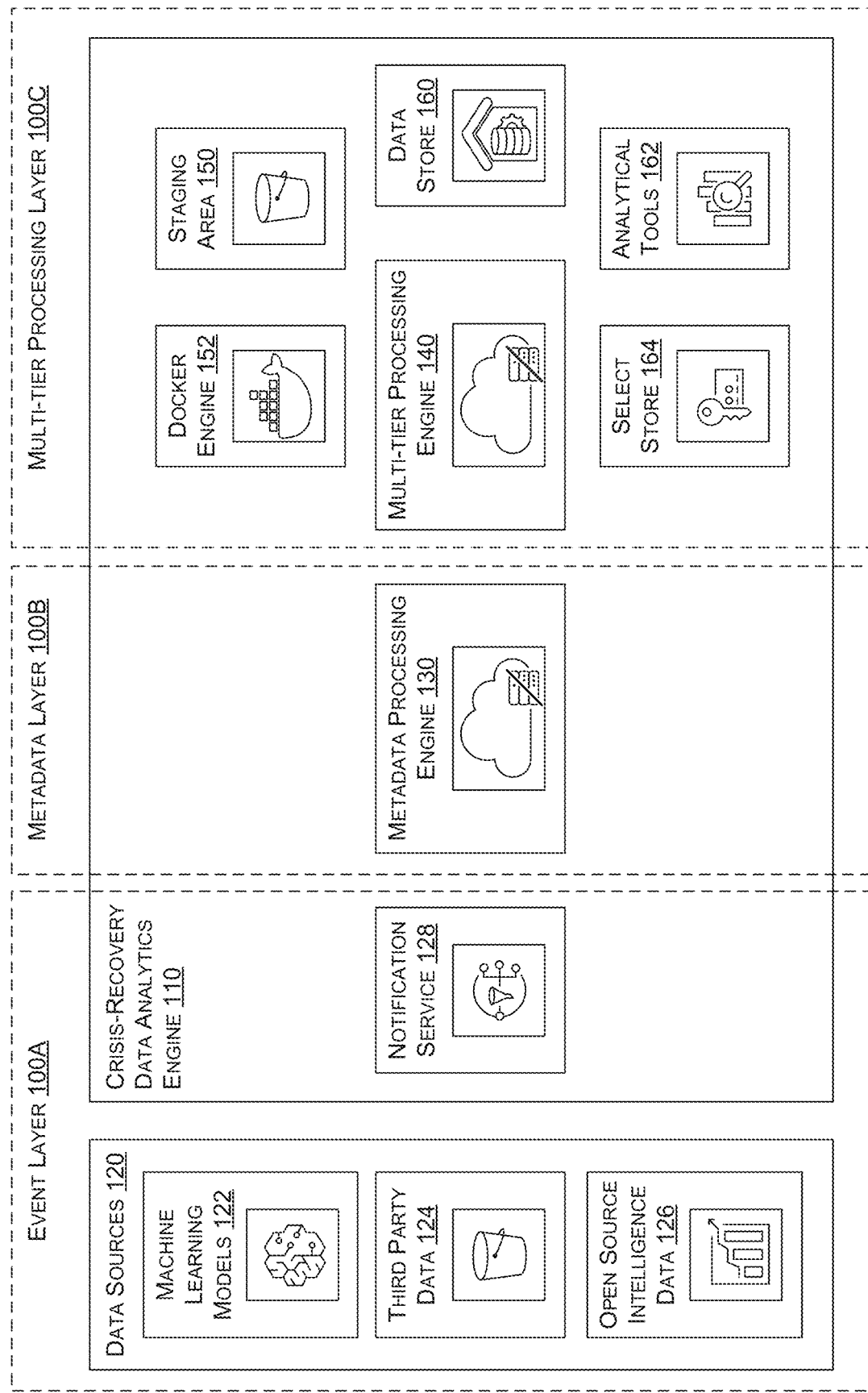
FIGS. 1A and 1B are block diagrams of an exemplary data analytics system with a crisis-recovery data analytics engine, in which embodiments described herein may be employed.

By way of background, data analytics systems support discovering useful information, informing conclusions and decision-making based on data. Private and public organizations often rely on data analytics systems to support operations in their organizations. For example, data analytics system can provide information for mitigating risk and fraud, and also provide information for optimizing and improving customer experiences. Data analytics systems use activity indexes—that are indicators of categories of activities—for identifying insights and trends associated with the categories. Machine learning approaches for demand forecasting further allow learning from data and improving analysis. Operationally, developing a machine learning model for forecasting can be performed via a machine learning engine that supports gathering training data, defining goals and metrics associated with training data features or attributes (e.g., product features, time features etc.)

Machine learning techniques can include Long Short-Term Memory (LSTM), Random Forest, and Linear Regression to develop forecasting models. For example, a linear regression approach can help predict future values from past values based on identifying underlying trends, so using historical data, additional information about the specific product, discounts, and average market cost, a prediction of a future value can be provided as a recommendation. The machine learning engine can further support training the forecasting models (i.e., using historical data and algorithms), validation (i.e., optimizing forecasting model parameters and hyper-parameters), and deployment (e.g., integration into production use). However, conventional machine learning models—that were built on stable historical data—are not helpful when using volatile crisis-period input data that does not align the stable historical data used to train the machine learning model. Using these machine learning models does not support making accurate predictions. The stable historical input and the volatile crisis-period input data can specifically be associated with monitoring economic activity. In this way, the machine learning models are no longer useful in forecasting demands, inventory planning, and supply chain optimization.

Conventional data analytics systems are not configured with a computing infrastructure and logic for making decisions when there exists volatility in input data. During a crisis period, input data can be inconsistent with training data of conventional data analytics systems, as such, the machine learning models are limited in identifying and using insights to make predictions with data associated with the crisis period. In this way, conventional data analytics systems fall short when there is volatility in input data, which makes the input data inconsistent with the training data of the machine learning models. For example, a pandemic could result in global impact on mobility and consumption data of users. Such an impact can make can increase the difficulty in making sense of input data to make predictions.

In addition, when such volatility is short-termed and not permanent, a recovery phase develops with recovery phase data that may not be understood using conventional data analytics systems and machine learning algorithms. For example, mobility data and consumption data in different geographies may not be consistent with historical data in a way that allows conventional data analytics systems to make reliable predictions. Moreover, when the scope of the change of the input data is significant (e.g., global), this proportionally is impactful on the reliability of any results generated from the changed input data. For example, an activity index that includes conventional dimensions of data without accounting for volatility cannot support a data analytics system in identifying patterns in the data, and conventional data analytics system built with machine learning models that process conventional dimensions are limited in their capacity to generate insights when input data is volatile. As such, a more comprehensive data analytics systems—having an alternative basis for providing data analytics systems operations—can improve computing operations and interfaces in data analytics systems.

Embodiments of the present disclosure are directed to providing a data analytics index associated with consumer activity to support a crisis-recovery data analytics engine in a data analytics system. The data analytics index is a consolidated single index (i.e., a consumer activity index "CAI") representation of a set of consumer behaviors with hierarchical and granular data. The crisis-recovery data analytics engine operates—using crisis-recovery-based machine learning model—to generate the data analytics index that includes input data associated with a pre-crisis period, a crisis period, and a crisis-recovery period.

The data analytics index is generated or derived based on a data driven approach that tracks consumer activity. An index generation engine generates the data analytics index based on index generation operations including identifying a set of consumer behaviors related to a set of variables, tracking the set of consumer behaviors, consolidating the set of consumer behaviors into a single index, and anchoring the data analytics index to a date associated with a crisis. The data analytics index is associated with geographic regions via hierarchy and granularity data, where the variables of the consumer behaviors are associated with mobility change (i.e., mobility data) and spending change (i.e., spending data). In this way, the data analytics index is a consumer activity index that summarizes a unique set of variables into the single index, where the single index is associated with a quantified score that indicates a level of recovery from the crisis.

At a high level, the data analytics index is an activity index that can support monitoring of evolving economic activity (e.g., recovery phase associated with a crisis event). In particular, monitoring hierarchical and granular data associated with rapidly evolving economic activity (also referred to as consumer activity) of geographical regions during a crisis-recovery period. Hierarchical data can refer to the data in a data structure where items are linked to each other in parent-child relationships in an overall tree structure or hierarchical relationships. Granular data can refer to detailed data, or lowest level of data that can be in a target set. For example, hierarchical and granular data can refer to data provided at different levels of a geographical region (e.g., country, state, city, county, etc.)

Hierarchal and granular data can specifically include mobility data and spending data that when can be processed through a machine learning model—that is trained specifically on crisis-recovery machine learning model techniques—to quantify crisis recovery and support making predictions on economic activity. Identifying the set of consumer behaviors can include aggressively refining the set of consumer behaviors based on a training and retraining process with a defined training window. The training window can specifically define a subset of data that are trained without retraining the entire time series. The training window can be fixed or defined so the weights that are derived by the algorithms are roughly the same through each training window with new input data. Due to the training window that is used, the CAI is inherently a recovery index (i.e. once the underlying variables are back to pre-crisis levels (e.g., February 2020 levels w.r.t. COVID-19 pandemic) so will the data analytics index.

The data analytics system supports the crisis-recovery data analytics engine for generating the presenting the data analytics index ("index"). For example, the crisis-recovery data analytics engine can specifically process information associated with a crisis and recovery from the crisis. The crisis-recovery data analytics engine include an index generating engine, where the index generating engine is configured to execute index generation operations that support each of the following: identifying at set of consumer behaviors related to a set of variables, the set of variables of the consumer behaviors are associated with mobility data associated with residential, grocery, pharmacy, retail, recreation, transit station, and workplace data and spending data associated with restaurants, hotels, airline, ride share, food delivery, amazon, online grocery, apparel, accessories, fitness, entertainment data. The index generation operations support consolidating and presenting the set of consumer behaviors as part of a single index. The index generation operations further include performing a Principal Component Analysis (PCA) to generate the data analytics index. The PCA can include dimensionality reduction algorithm to project a high dimensional data (e.g., the set of variables) into a lower dimensional space. In this way, generating the data analytics index—consumer activity index—can be based on a linear combination of the underlying set of variables. The set of variables are associated with weights, where the weights are given by the PCA, making the index easily interpretable. The crisis-recovery data analytics engine further supports a data visualization engine configured to provide data visualizations based on the data analytics index. The data visualizations can specifically be related to crisis and recovery phases for a variety of industries and geographic regions with corresponding hierarchical and granular data.

Advantageously, the crisis-recovery data analytics engine intelligently aggregates data from different types of sources associated with a specific crisis-recovery period and economic activity, unlike conventional consumer activity indices that did not contemplate aggregating different sources in this manner. The hierarchical and granular data that is contemplated for the crisis-recovery data analytics engine is curated data—and associated with geographic regions such that the data analytics index supports periodically (e.g., weekly) comparing the data across geographically regions. The crisis-recovery machine learning model techniques further circumvent the need for having years of historical data to be able to properly train a machine learning model to support understanding the economic activity—associated with different geographic regions—during a crisis-recovery phase.

Figure 1B:
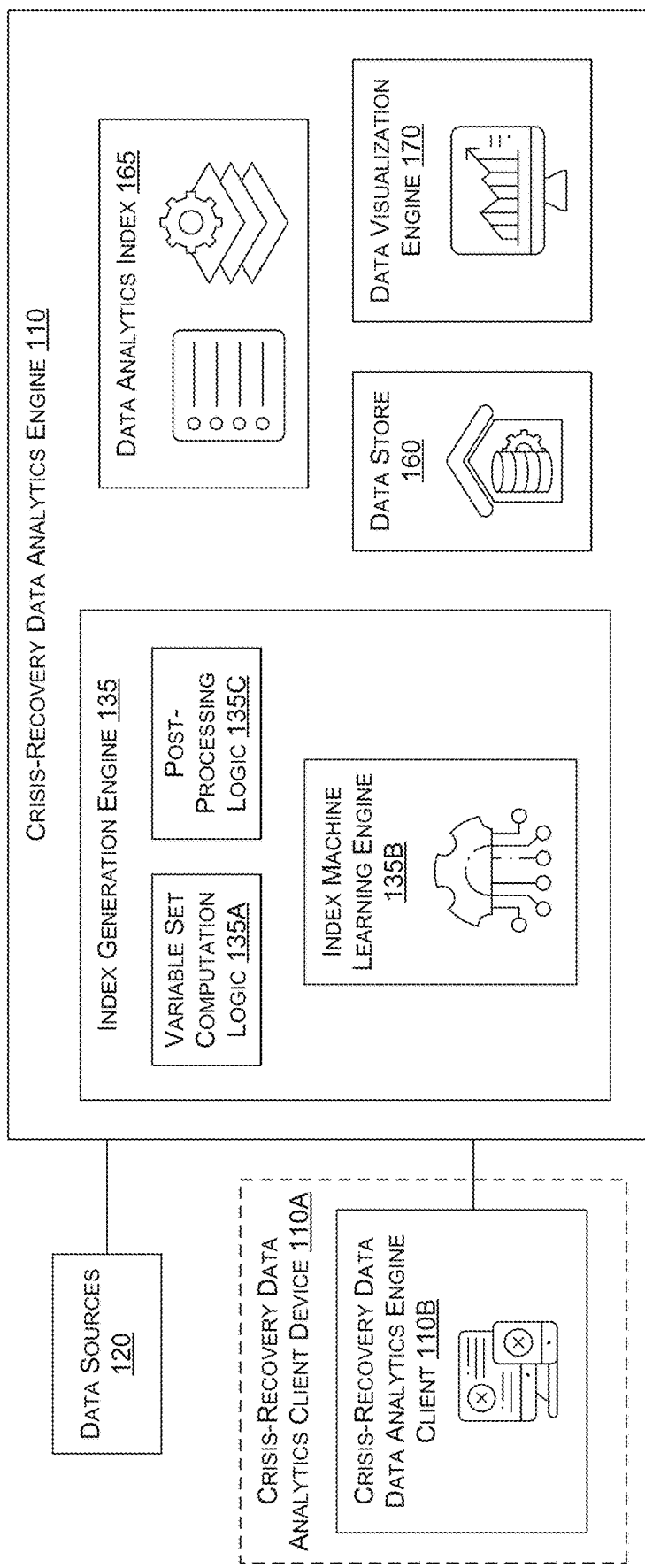
Figure 1C:
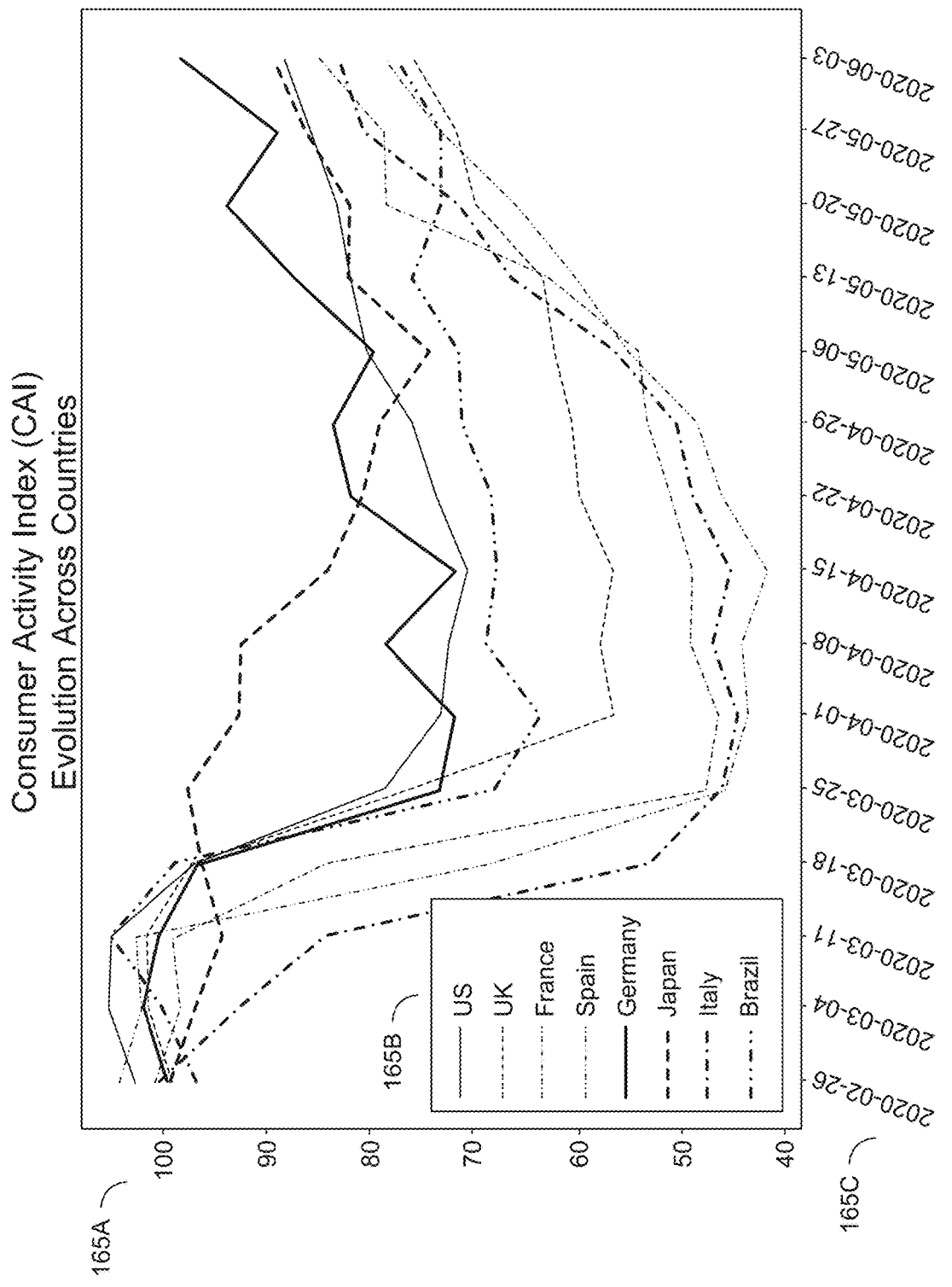
FIG. 1C-1E are exemplary schematics associated with a data analytics system with a crisis-recovery data analytics engine in which embodiments described herein may be employed.

Aspects of the technical solution can be described by way of examples and with reference to FIGS. 1A, 1B, and 1C. FIG. 1A illustrates a data analytics system 100—also referred to herein as the multilayer processing system—including an event layer 100A, metadata layer 100B, multi-tier processing layer 100C, and crisis-recovery data analytics engine 110. The event layer 100A includes data sources 120 including machine learning models 122, third party data 124, open source intelligence data 126, and notification service 128. The metadata layer 100B includes the metadata processing engine 130, and the multi-tier processing layer 100C includes multi-tier processing engine 140, staging area 150, docker engine 152, data store 160, analytical tools 162, and secret store 164.

The embodiments described herein can be provided via a multilayer processing engine 130 in data analytics system 100 (i.e., a multilayer processing system). The data analytics system 100 corresponds to the data analytics system 100 in U.S. application Ser. No. 17/845,851 entitled "MULTI-LAYER PROCESSING ENGINE IN A DATA ANALYTICS SYSTEM," which is incorporated herein in its entirety. The metadata layer 100B can refer to a functional component that interacts in a sequential hierarchy—relative to an event layer and a multi-tier processing layer 100C—to analyze incoming event streams and configure downstream processing. The metadata layer 100B provides for dynamic metadata configuration of data associated with the event layer 100A and the multi-tier processing layer 100C. The data analytics system—operating via a serverless distributed computing system. The data analytics system (i.e., a multilayer processing system) implements the multilayer processing engine 130 as a serverless data analytics management engine for processing high frequency data at scale. The multilayer processing engine 130 can dynamically scale the infrastructure to changing workloads—as workloads increase or decrease—by provisioning computing components on an as-needed basis. The multilayer processing engine 130 is implemented in a decoupled and cost-effective architecture. The multilayer processing engine 130 also supports ETL processes that can be extended rapidly and do not require maintenance tasks.

With reference to FIG. 1B, FIG. 1B illustrates aspects of the crisis-recovery data analytics engine 110. FIG. 1B includes crisis-recovery data analytics client device 110A and crisis-recovery data analytics engine 110B, data sources 120, index generation engine 135—variable set computation logic 135A, index machine learning engine 135B, post-processing logic 135C, data store 160, data analytics index 165, and data visualization engine 170.

Building the data analytics index 165 ("consumer activity index"—used herein interchangeably) can include identifying a set of variables that are part of the input data (including training data) Input data can include mobility data and spending data, specifically: periodic mobility data for particular geographical regions and periodic spending data such as credit card spending year over year. The consumer activity index can be anchored to a specific date associated with the crisis period in order to generate the consumer activity index as a recovery index. The anchor date can be associated with a crisis baseline of a set of variables in the consumer activity index. With the anchor date, the consumer activity index can support quantifying how far from recovery a selected geographic region is, based on the variables of the consumer activity index and aggregated data—since the anchor date—for the selected geographic region. The set of variables can include their pre-crisis values that can be compared to the crisis-recovery period values.

By way of example, mobility data can indicate how much movement there existed prior to the anchor date and after the anchor date for particular region. The mobility data can be coded based on a percentage difference value of the crisis baseline variables and values of the crisis baseline variables after the anchor date. For example, the mobility data can indicate that workplace mobility is down 60% in a city since the beginning of the crisis. Spending data can be joined with the mobility data to generate the crisis-recovery input data used in the index.

Building the consumer activity index can further including weighting and pruning the variables and their contribution to the index. In one embodiment, the data sources may provide mobility data or spending data, but a subset of the data from the data sources are used. For example, manually identified variables associated with mobility data and manually identified variables associated with the spending data are used to identify data that supports building the consumer activity index. Variables associated with the data, where the variables are not indicative of economic activity, can be left out when building the set of variable. For example, recreational park mobility data can be discarded, while grocery store mobility data is preserved.

Discarding different variables can be based on their impact (or lack of impact) on the consumer activity index as calculated via a variable set computation algorithm. For example, a threshold impact value can be identified for discarding variables from the set of variables. In particular, variables can be associated with weights that quantify a loading factor of the particular variable into the index. A machine learning engine can support training a machine learning model at the beginning of a crisis period, where variables that have the most variants through an early period of the crisis would have the most impact (i.e., weight) on the index. For example, a workplace mobility variable can positively impact the index, while the residential mobility variable can negatively impact the index. Similarly, spending data associated with food delivery positively impacts the index, while spending data associated with airline travel negatively impacts the index. In this way, the consumer activity index is built based on iteratively adding, removing, and weighting variables for the final consumer index. Iteratively evaluating variables can yield a final index where redundant or steady variables do not impact the final index.

The index can be presented at different periods of time associated with different hierarchical and granular data (and features) associated with different geographic regions. For example, the index can be generated weekly, where the consumer activity index is generated as a US country level, US state level, or a US county level. As such, a comparison can be made between residential mobility between a first week and a second week for a particular state, where the residential mobility can be shown as increasing by 80% between the first week and the second week for the state. Data that is available only at a higher level of granularity (e.g., state level) can be inherited by a lower level (e.g., county level). In this way, there exists different views (e.g., hierarchical views, granularity views, data views, time series views) for the consumer activity index data, which can be compared across geographic regions.

A view can be associated with the specific data that explains the consumer activity index number associated with the view. For example, the consumer activity index number can be 75/100 for California, so interface elements can correspond to the consumer activity index variables and data associated with California and that support identifying the consumer activity index number as 75/100. In addition, variables that positively or negatively impact the consumer activity index can also be identified. The views immediately summarize complex consumer index information to concise present the most relevant information via the view.

Generating the data analytics index is based on PCA that takes high dimensional space (e.g., 35 variables) and projects the data into a one dimensional space (i.e., data analytics consumer activity index). The one dimensional space can be used in scoring different aspects of the data analytics index. PCA includes extracting vector via a covariance matrix of the data and further includes loading weights the set of variables of the index. Generating the data analytics index further includes a post-processing step that includes adding an intercept to anchor the data at a predefined reference level (e.g., 100). This simple transformation (and scaling) to shift the curve can facilitate having the reference baseline at a given data, such that, the data analytics index number indicates a relative change from the anchor date with respective to the reference level.

With reference to FIG. 1C, FIG. 1C illustrates aspects— schema representations—of the data analytics index 165. In particular, the data analytics index 165 can be referred to as a consumer activity index that is associated with different countries and dates. The graph includes a data analytics index score 165A for each country 165B on the corresponding date 165C. As shown, the data analytics index score is generated weekly for each country and the corresponding change in the data analytics index score 165A is charted in the graph. The data analytics index score 165A is a quantified measure of tracked consumer activity. The data analytics index score 165A can be anchored to a particular date (e.g., 100 at 2020 Feb. 19) and the subsequent data analytics score quantify a relative change in consumer activity. A plurality of data visualizations can be generated for presenting different aspects of the data analytics index 165— including data indicating impact of specific set of variables as discussed in more detail below. The data visualizations described herein can be communicated and caused to be presented on the crisis-recovery data analytics engine client 110B on a crisis-recovery data analytics client device 110A.

Figure 1D:
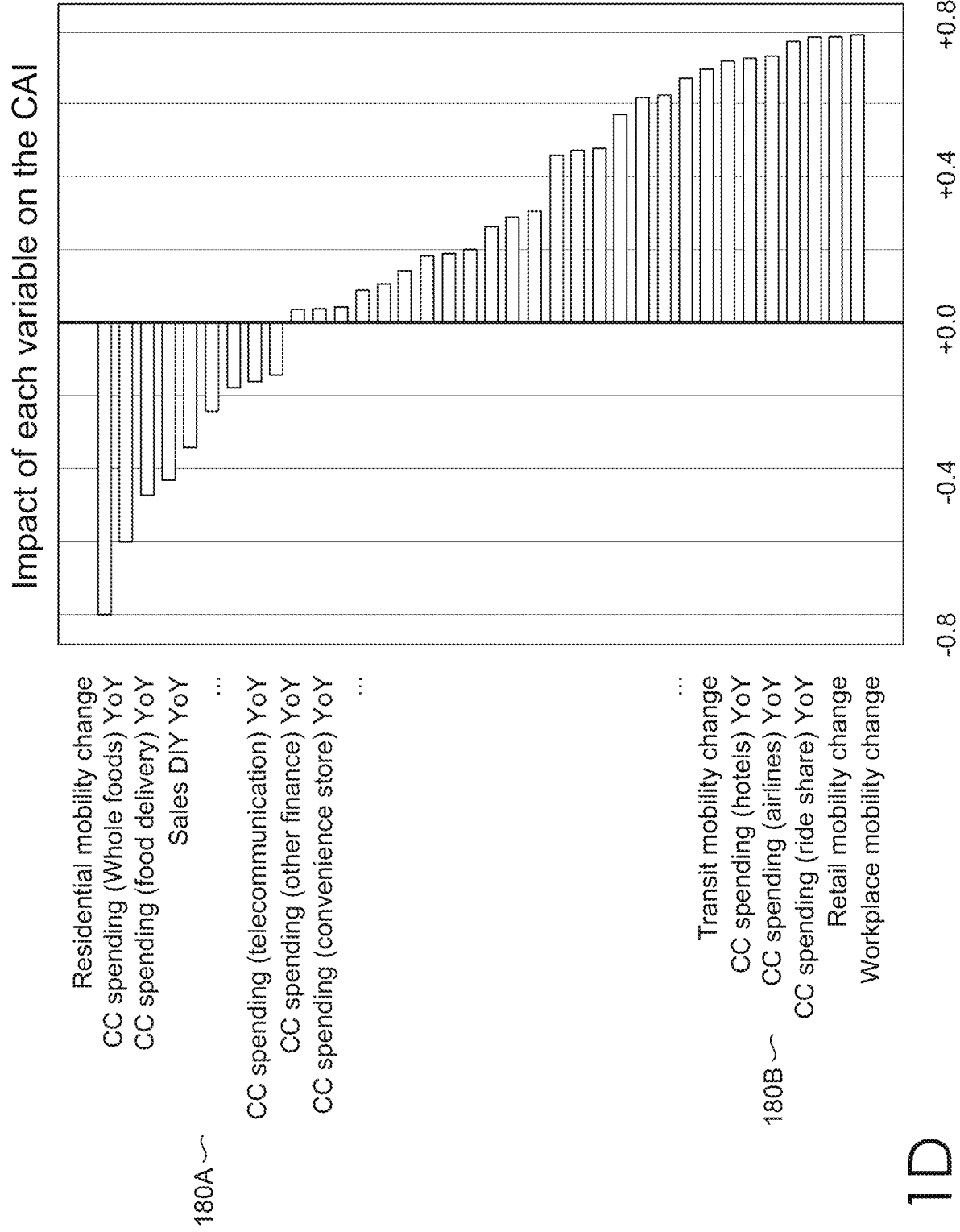
Figure 1E:
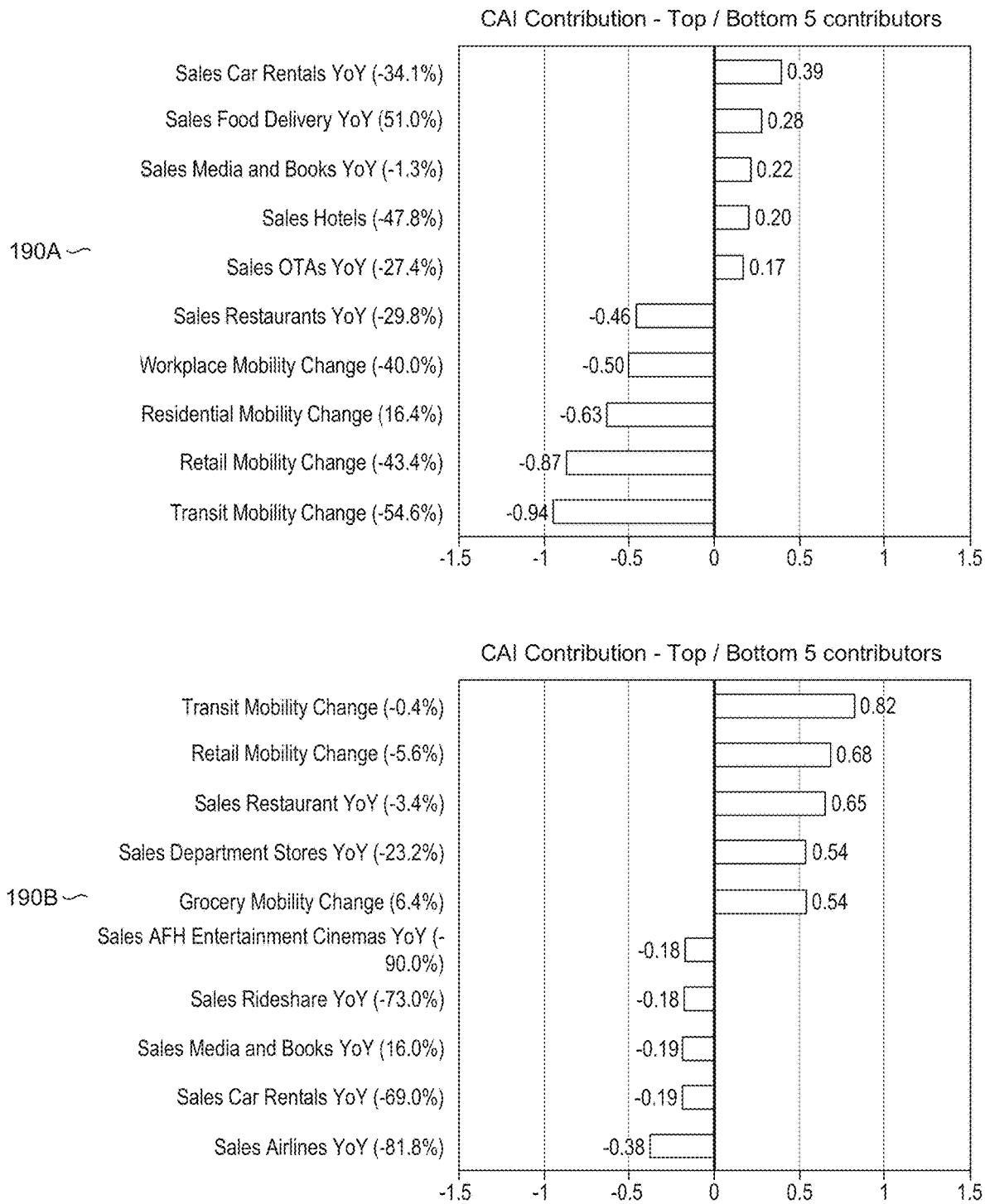

With reference to FIG. 1D, FIG. 1D illustrates aspects— schema representations—of the data analytics index 165. In particular, the data analytics index 165 can be associated with a quantified impact of each variable in a set of variables used to generate the data analytics index 165. A first set of variables 180A indicate a negative impact on the data analytics index. For example, intuitively with regard to a pandemic crisis event, the set of variables correlate with lockdown and restriction measures. A second set of variables 180B indicate a positive impact on the data analytics index. And, in FIG. 1E, a first set of variables 190A associated with YoY impact on the data analytics index 165 and a second set of variables 190 associated with YoY impact on the data analytics index 165. Intuitively, with regard to a pandemic crisis event, the set of variables inversely correlate with lockdown and restriction measures.

Figure 2A:
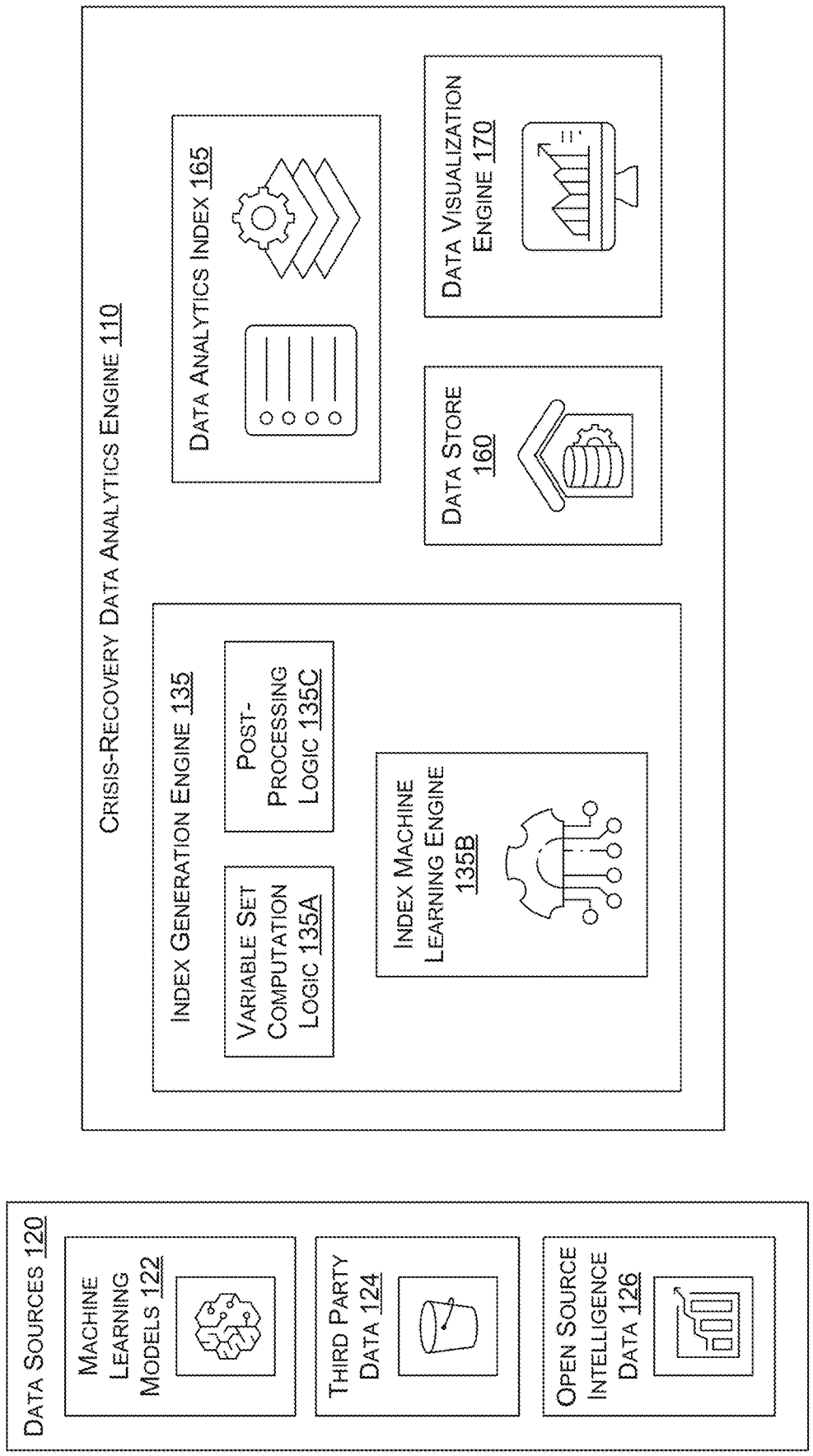
FIGS. 2A and 2B are block diagrams of an exemplary data analytics system with a crisis-recovery data analytics engine, in which embodiments described herein may be employed.
Figure 2B:
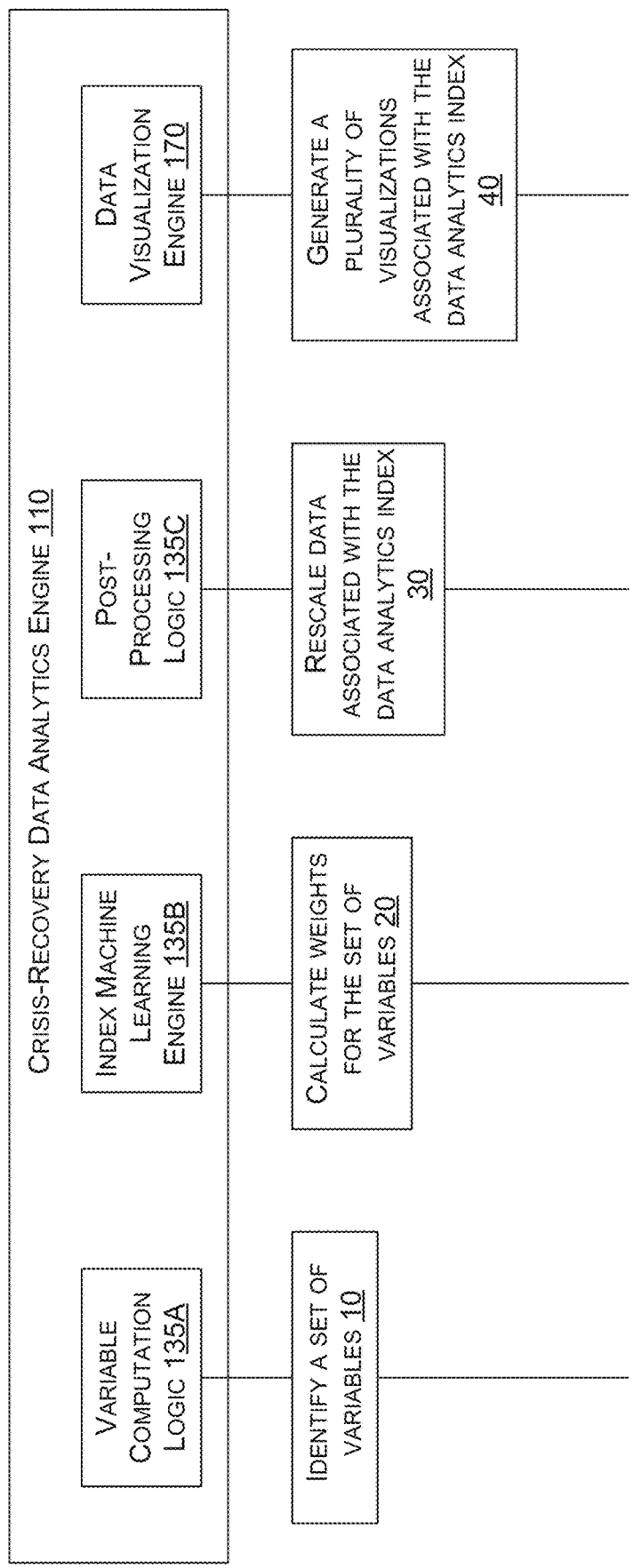

Aspects of the technical solution can be described by way of examples and with reference to FIGS. 2A and 2B. FIG. 2A is a block diagram of an exemplary technical solution environment, based on example environments described with reference to FIGS. 6 and 7 for use in implementing embodiments of the technical solution are shown. Generally the technical solution environment includes a technical solution system suitable for providing the example data analytics system 100 in which methods of the present disclosure may be employed. In particular, FIG. 2A shows a high level architecture of the data analytics system 100 in accordance with implementations of the present disclosure. Among other engines, managers, generators, selectors, or components not shown (collectively referred to herein as "components"), the technical solution environment of data analytics system 100 corresponds to FIGS. 1A and 1B.

With reference to FIG. 2A, FIG. 2A illustrates data analytics system 100 including data sources 120 having machine learning models 122, third party data 124, open source intelligence 126, crisis-recovery data analytics engine having index generation engine 135—including variable set computation logic 135A, index machine learning engine 135B, post-processing logic 135C; data analytics index 165, and data visualization engine 170.

The crisis-recovery data analytics engine 110 supports generating the data analytics index 165 based on the crisis-recovery dataset. The data analytics index 165 can be used to generate (e.g., using the data visualization engine 170) different types of data visualizations including crisis-recovery data indicating recovery from a crisis event. In operation, the crisis-recovery data analytics engine 110 aggregates a pre-crisis dataset and a crisis dataset associated with a set of variables of an initial set of consumer behaviors. The pre-crisis dataset and the crisis dataset can be retrieved from data sources 120 or data store 160.

The pre-crisis dataset refers to data—associated with consumer behaviors—prior to a crisis event and the crisis dataset refers to data—associated with consumer behaviors—after the crisis event. In particular, the pre-crisis dataset is historical consumer activity data prior to an anchor date associated with the data analytics index and the crisis dataset is new consumer activity data after the anchor date. Moreover, the pre-crisis dataset and the crisis dataset include mobility data for quantifying mobility change and spending data for quantifying spending change. The mobility and spending are explicit categories associated with the crisis-recovery dataset.

The crisis-recovery data analytics engine 110 is configured to train (e.g., via index machine learning engine 135B) a crisis-recovery machine learning model for selecting (e.g., variable set computation logic 135A) a set of consumer behaviors (from an initial set of consumer behaviors) that support quantifying recovery from the crisis event. Training the crisis-recovery model includes retraining the crisis-recovery model using a subset of the pre-crisis dataset and the crisis dataset to refine the initial set of consumer behaviors to the set of consumer behaviors. Training the crisis recovery model can include accessing training data including the pre-crisis dataset having a pre-crisis results data associated with a pre-crisis data analytics model. Using the training data to train the crisis-recovery data analytics model, where training the crisis-recovery data analytics model comprises analyzing the pre-crisis results data. The crisis recovery data analytics model is deployed in the data analytics system to support analyzing input data based on comparing a first set of results associated with the crisis-recovery data analytics model to the pre-crisis results data.

The crisis-recovery data analytics engine 110 analyzes the pre-crisis dataset and the crisis dataset using the crisis-recovery machine learning model. Based on analyzing the pre-crisis dataset and the crisis dataset, a set of variables of a set of consumer behaviors that support quantifying recovery from the crisis event are identified. The set of consumer behaviors are a subset of the initial set of consumer behaviors. A crisis baseline associated with an anchor date of the crisis event can be generated based on values of the set of variables associated with the anchor date.

The crisis-recovery data analytics engine 110 accesses a crisis-recovery dataset associated with the set of variables of the set of consumer behaviors. The crisis-recovery dataset is associated with geographic regions via a hierarchy and granularity data. The crisis-recovery data analytics engine 110 generates the data analytics index 165 based on the crisis-recovery data set. The data analytics index 165 is generated based on operations of an index machine learning engine (i.e., weighting and pruning) that includes a calculating weights for the set of variable, executing a linear combination of weights corresponding to the set of variables, and principal component analysis comprising a dimensionality reduction algorithm. The weights quantify a loading factor of a corresponding variable into the data analytics index 165 and the principal component analysis supports generating the a score for different geographical regions associated with a data analytics index. The score (i.e., data analytics index score) is a one dimensional space representation of values of the set of values of the set of variables associated with a corresponding geographical region. Generating the data analytics index 165 can further be based on post-processing logic 135C that includes anchoring the data analytics index 165 to an anchor date associated with the crisis event based on rescaling data associated with the data analytics index.

Using the data visualization engine 170, the crisis-recovery data analytics engine generates different types of data visualizations including crisis-recovery data indicating recovery from a crisis event. A first data visualization can include a first subset of variables of the set of variables that positive impact the data analytics index 165 and a second subset of variables of the set of variables that negatively impact the data analytics index 165. A second data visualization can include at least two different time periods and crisis-recovery data associated with each time period. A third data visualization can include a geographical region associated with at least two levels of hierarchy of the geographical region and crisis-recovery data associated with each level of hierarch of the geographical region. A fourth data visualization can include crisis-recovery data indicating recovery relative to a crisis baseline associated with the set of variables of the set of consumer behaviors.

With reference to FIG. 2B, FIG. 2B illustrates crisis-recovery data analytics engine 110 that supports performing operations to generate a data analytics index associated with consumer activity. At block 10, using variable computation logic 135A, identify a set of variables. At block 20, using an index machine learning engine 135B, calculate weights for the set of variables. At block 30, using post processing logic 135C, rescale data associated with the data analytics index. At block 40, using a data visualization engine 170, generate a plurality of visualizations associated with the data analytics index.

Figure 2C:
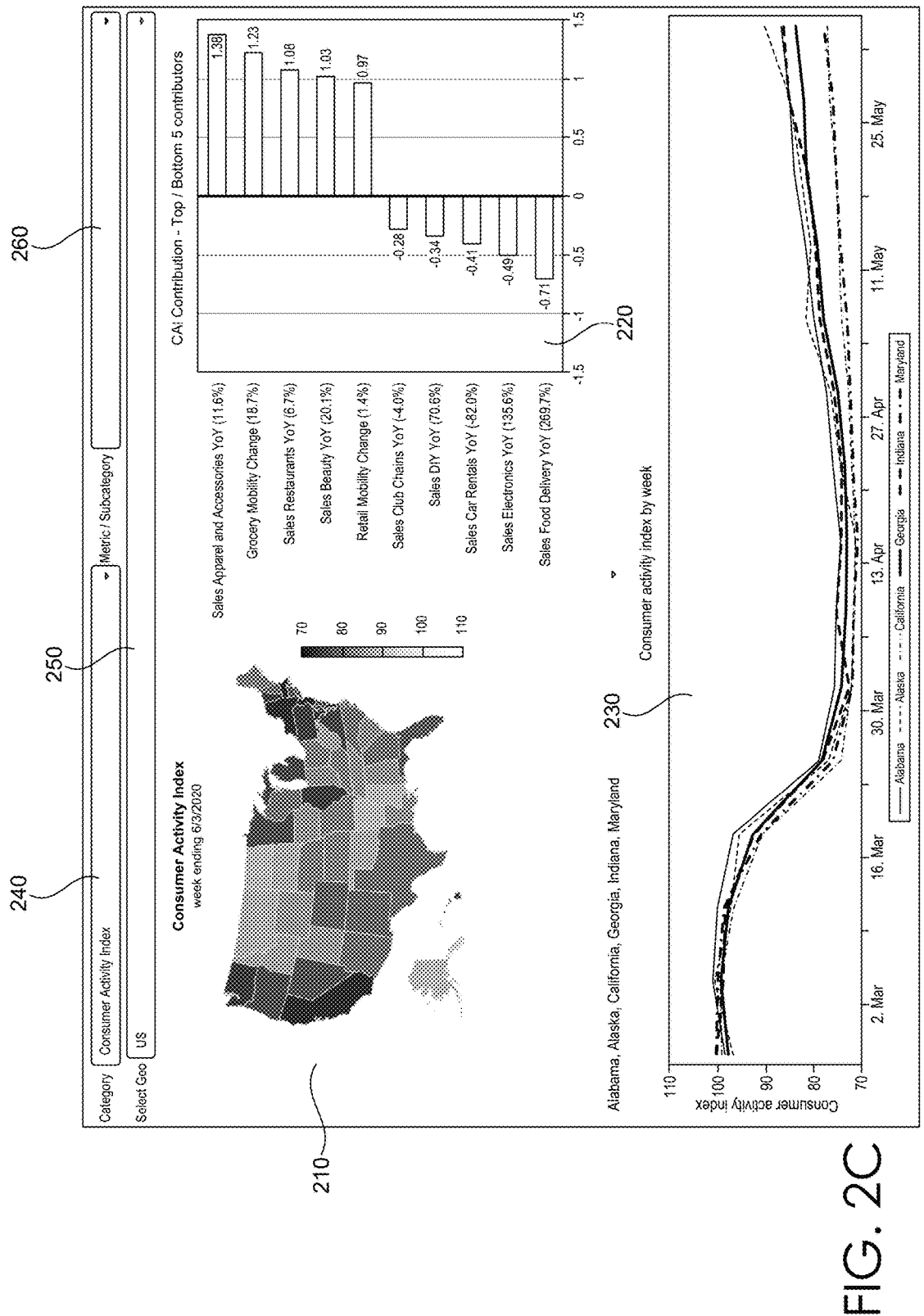
FIGS. 2C-2D are exemplary schematics associated with a data analytics system with a crisis-recovery data analytics engine in which embodiments described herein may be employed.
Figure 2D:
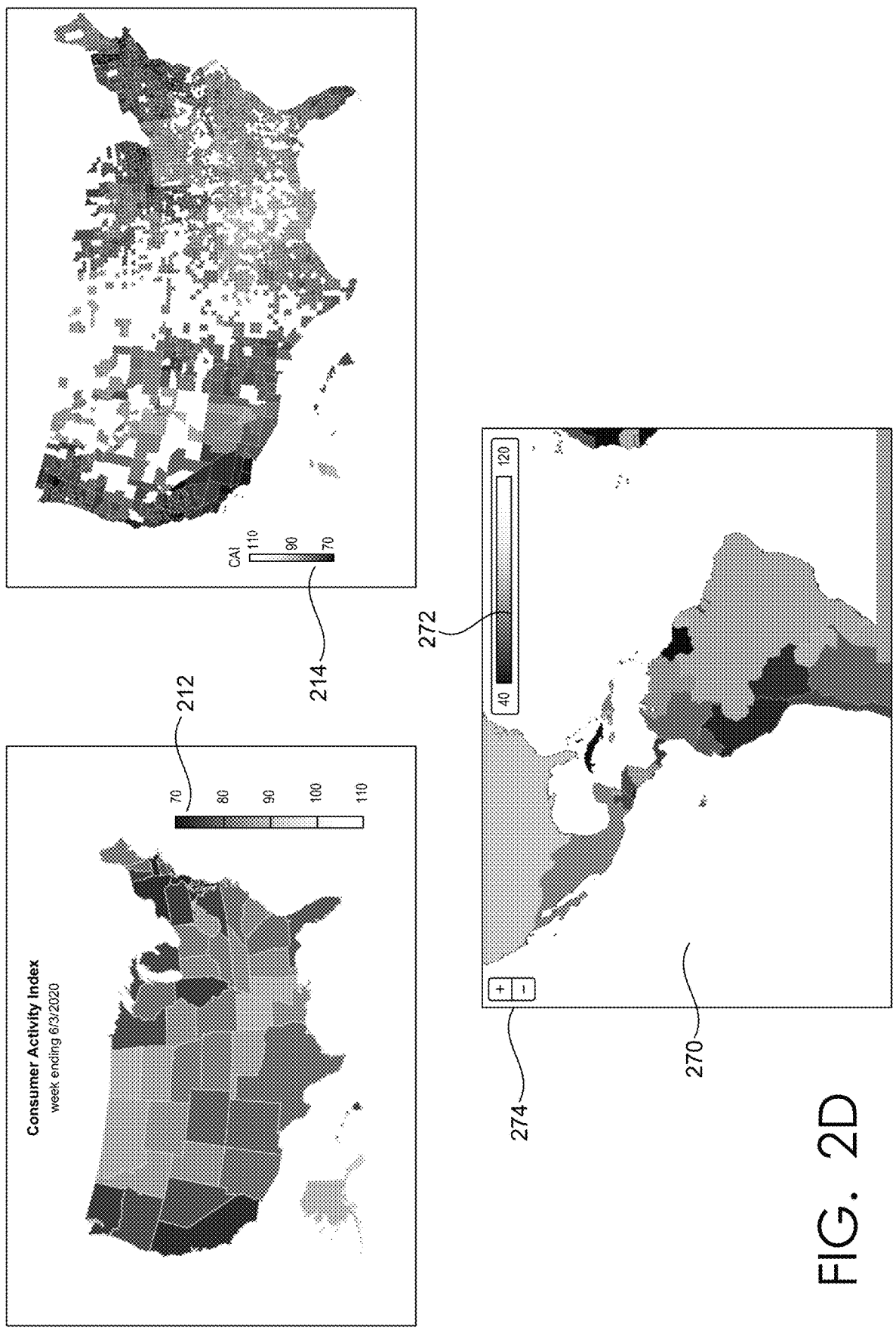

With reference to FIGS. 2C and 2D, FIGS. 2C and 2D illustrate aspects—interface representations—associated with the crisis-recovery data analytics engine 110 and data visualization engine 170. At a high level, the data visualization engine 170 operates to generate interface data (e.g., crisis-recovery data visualizations). Interface data includes user interface elements, crisis-recovery data visualizations, and instructions on how to generate corresponding user interfaces that support interactions between users and the crisis-recovery data analytics engine.

User interfaces allow effective operation and control by users while the customer relationship management system simultaneously perform computing operations. Interface data can include graphical user interfaces that allow users to interact with the data analytics system 100. A graphical user interface can include data visualization that that provides a visual display of crisis-recovery data. The crisis-recovery data can specifically include human-readable insights (e.g., plain-text or text-based graphical user interface elements) that explain to the user insights derived from the data analytics index.

With reference to FIGS. 2C and 2D, FIGS. 2C and 2D illustrate a crisis-recovery data dashboard 200 ("dashboard") that provides at-a-glance views and detail views of consumer behaviors that are relevant to the crisis-data analytics engine functionality described herein. The dashboard 200 can be used to cause display of information associated with crisis-recovery data analytics model. The dashboard 200 can include interface elements associated with crisis-recovery data including mobility data and spending data for geographical regions, where the crisis-recovery data is presented on based hierarchy and granular data.

The dashboard 200 include a geographical region map portion 210, a crisis-recovery data bar chart 220, a crisis-recovery data graph 230 that are different types of data visualizations for the crisis-recovery data. The dashboard 200 further includes a category selector 240, geographical region selector 250, and a metric/subcategory selector 260. The geographical region map portion can be used to show a geographical region map and corresponding crisis-recovery data corresponding and a data analytics index score for one or more hierarchical levels of a geographical region of the map. As shown in FIG. 2D, the data analytics index score can have a data analytics index score legend 212 for different geographical regions. The data analytics index score legend 214 can have a range of data analytics index scores that correspond to the range of data analytics index scores of the geographical regions that are currently shown.

The dashboard 200 can further support selecting different geographical regions and levels of geographical. regions (e.g., geographical region 270) with a corresponding geographical region legend 272 that corresponds to the data analytics index scores of the geographical region. For example, a zoom in-out controller 274 can be used to zoom in or zoom out of different geographic regions to show their corresponding crisis-recover data. The crisis-recovery data bar chart 220 includes a set of variables and their corresponding impact (e.g., positive impact or negative impact) on the data analytics index. The crisis-recovery data graph 230 includes a data analytic index score for corresponding different geographical region for specific data. Other variations and combinations of data visualizations for crisis-recovery data are contemplated with embodiments described herein.

Exemplary Methods

Figure 3:
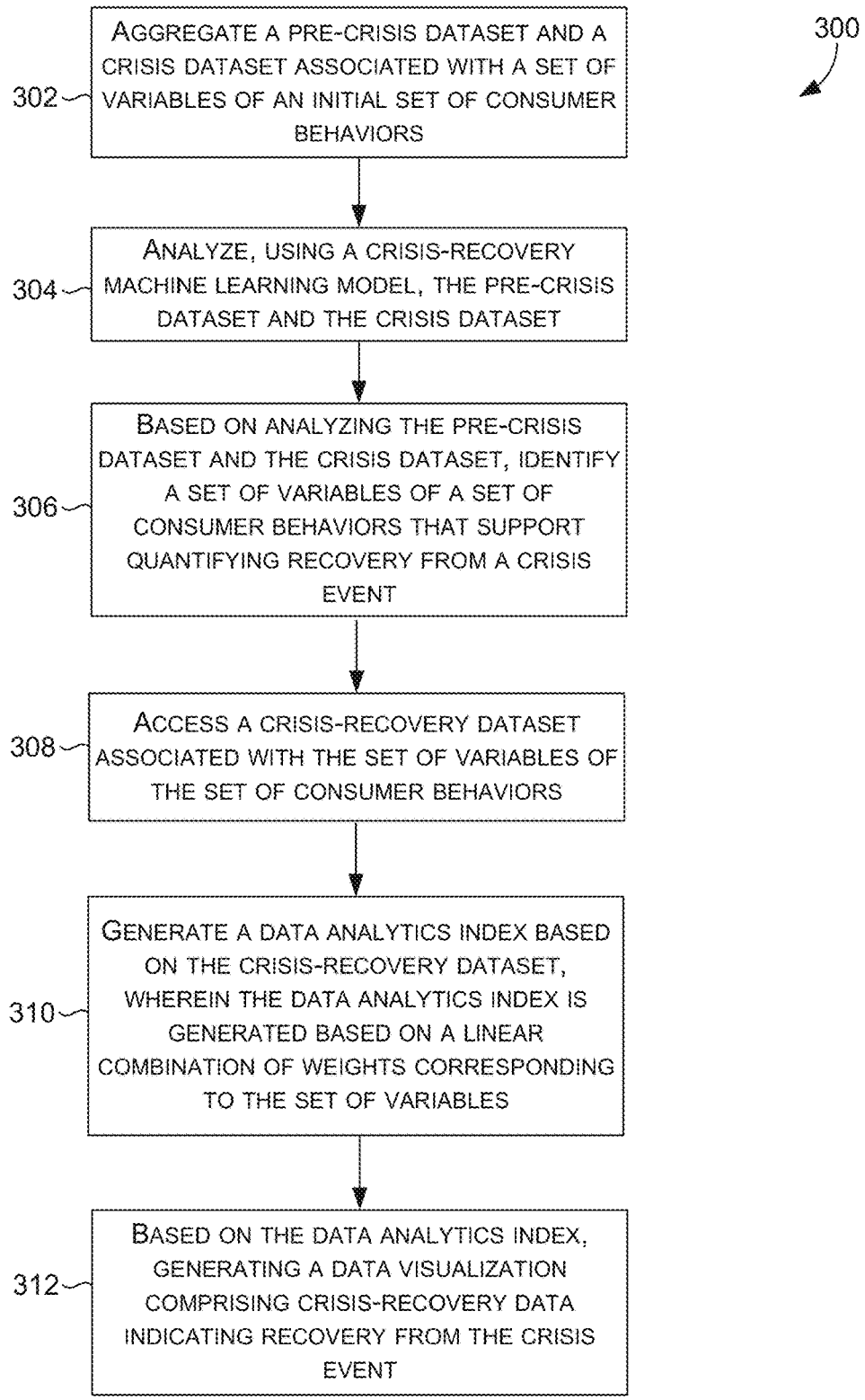
FIG. 3 is a flow diagram showing an exemplary method for implementing a data analytics system with a crisis-recovery data analytics engine, in accordance with embodiments described herein.
Figure 4:
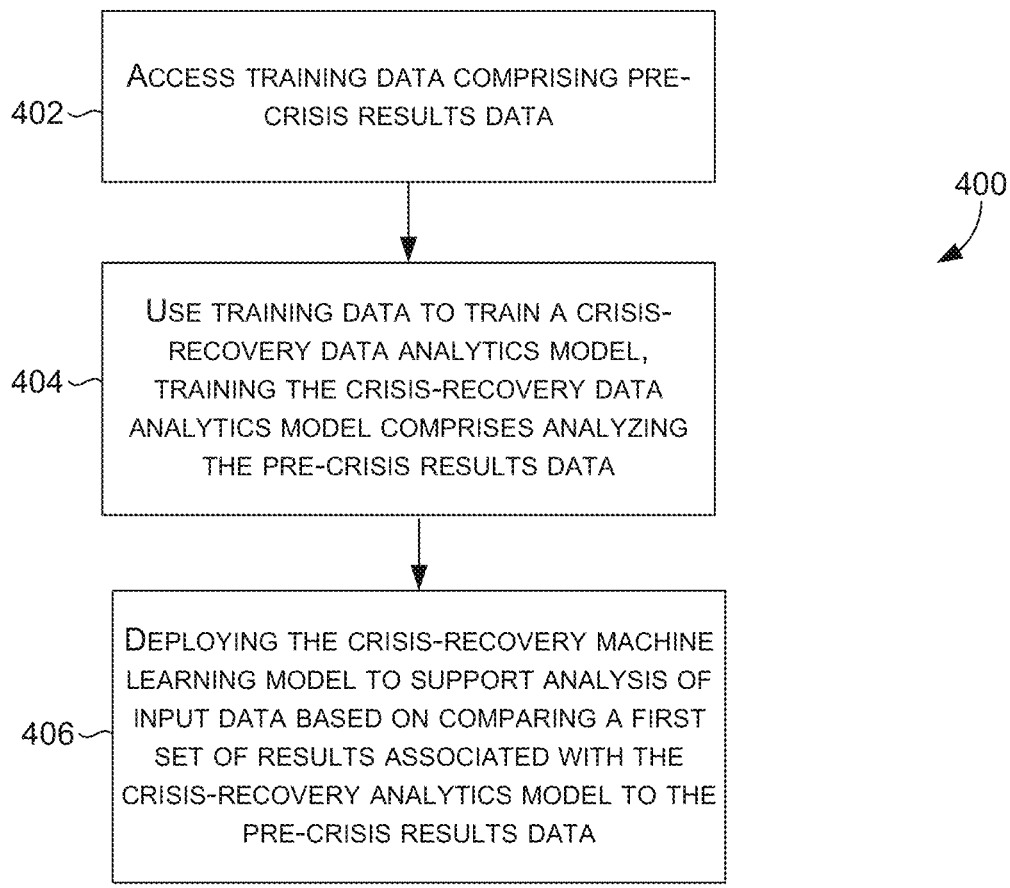
FIG. 4 is a flow diagram showing an exemplary method for implementing a data analytics system with a crisis-recovery data analytics engine, in accordance with embodiments described herein.
Figure 5:
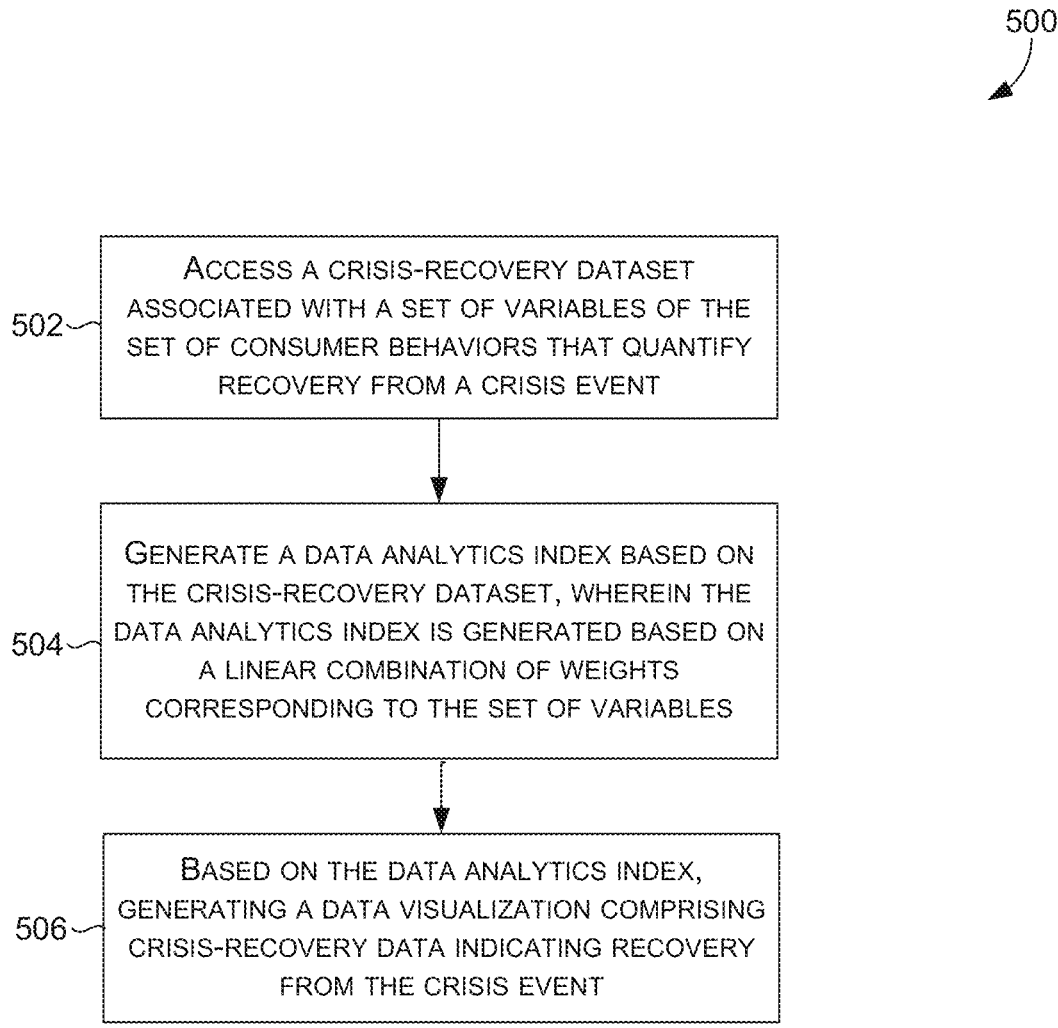
FIG. 5 is a flow diagram showing an exemplary method for implementing a data analytics system with a crisis-recovery data analytics engine, in accordance with embodiments described herein.

With reference to FIGS. 3, 4 and 5, flow diagrams are provided illustrating methods for providing data analytics index associated with consumer activity to support a crisis-recovery data analytics engine in a data analytics system. The methods may be performed using the data analytics system described herein. In embodiments, one or more computer-storage media having computer-executable or computer-useable instructions embodied thereon that, when executed, by one or more processors can cause the one or more processors to perform the methods (e.g., computer-implemented method) in the data analytics system (e.g., a computerized system or computing system).

Turning to FIG. 3, a flow diagram is provided that illustrates a method 300 for providing data analytics index associated with consumer activity to support a crisis-recovery data analytics engine in a data analytics system. At block 302, aggregate a pre-crisis dataset and a crisis dataset associated with a set of variables of an initial set of consumer behaviors. At block 304, analyze, using a crisis-recovery machine learning model, the pre-crisis dataset and the crisis dataset. At block 306, based on analyzing the pre-crisis dataset and the crisis dataset, identify a set of variables of a set of consumer behaviors that support quantify recovery from a crisis event. At block 308, access a crisis-recovery dataset associated with the set of variables of the set of consumer behaviors. At block 310, generate a data analytics index based on the crisis-recovery dataset. The data analytics index is generated based on a linear combination of weights corresponding to the set of variables. At block 312, based on the data analytics index, generating a data visualization comprising crisis-recovery data indicating recovery from the crisis event.

Turning to FIG. 4, a flow diagram is provided that illustrates a method 400 for providing data analytics index associated with consumer activity to support a crisis-recovery data analytics engine in a data analytics system. At block 402, access training data comprising pre-crisis results data. At block 404, use the training data to train a crisis-recovery data analytics model, wherein training the crisis-recovery data analytics model comprises analyzing the pre-crisis results data. At block 406, deploy the crisis-recovery machine learning model to support analysis of input data based on comparing a first set of results associated with the crisis-recovery analytics model to the pre-crisis results data.

Turning to FIG. 5, a flow diagram is provided that illustrates a method 500 for providing data analytics index associated with consumer activity to support a crisis-recovery data analytics engine in a data analytics system. At block 502, access a crisis-recovery dataset associated with a set of variables of the set of consumer behaviors that quantify recovery from a crisis event. At block 504, generate a data analytics index based on the crisis-recovery dataset. The data analytics index is generated based on a linear combination of weights corresponding to the set of variables. At block 506, generate a data visualization comprising crisis-recovery data indicating recovery from the crisis event.

Example Distributed Computing System Environment

Figure 6:
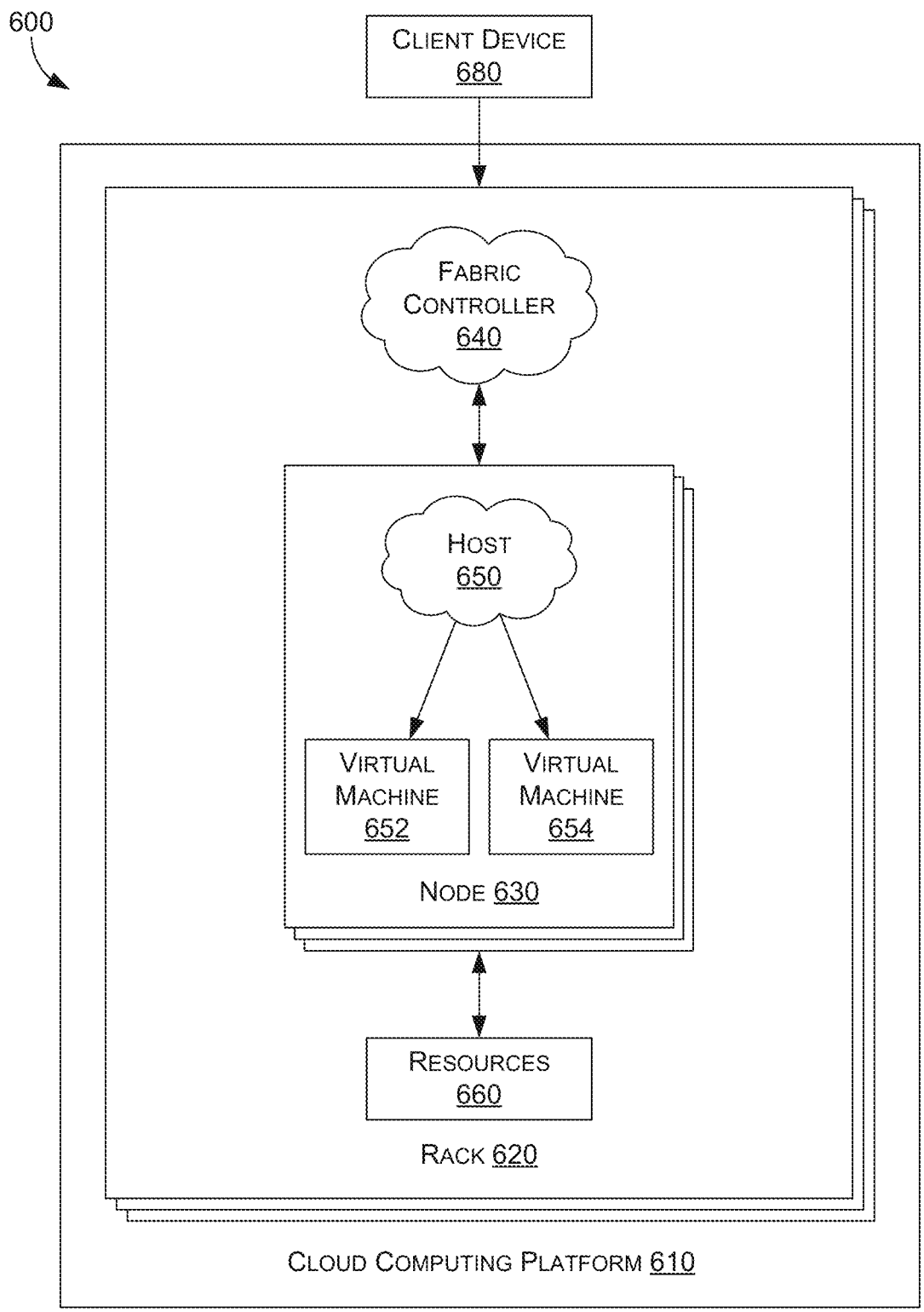
FIG. 6 provides a block diagram of an exemplary distributed computing environment suitable for use in implementing aspects of the technology described herein.

Referring now to FIG. 6, FIG. 6 illustrates an example distributed computing environment 600 in which implementations of the present disclosure may be employed. In particular, FIG. 6 shows a high level architecture of an example cloud computing platform 610 that can host a technical solution environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

Data centers can support distributed computing environment 600 that includes cloud computing platform 610, rack 620, and node 630 (e.g., computing devices, processing units, or blades) in rack 620. The technical solution environment can be implemented with cloud computing platform 610 that runs cloud services across different data centers and geographic regions. Cloud computing platform 610 can implement fabric controller 640 component for provisioning and managing resource allocation, deployment, upgrade, and management of cloud services. Typically, cloud computing platform 610 acts to store data or run service applications in a distributed manner. Cloud computing infrastructure 610 in a data center can be configured to host and support operation of endpoints of a particular service application. Cloud computing infrastructure 610 may be a public cloud, a private cloud, or a dedicated cloud.

Node 630 can be provisioned with host 650 (e.g., operating system or runtime environment) running a defined software stack on node 630. Node 630 can also be configured to perform specialized functionality (e.g., compute nodes or storage nodes) within cloud computing platform 610. Node 630 is allocated to run one or more portions of a service application of a tenant. A tenant can refer to a customer utilizing resources of cloud computing platform 610. Service application components of cloud computing platform 610 that support a particular tenant can be referred to as a tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 630, nodes 630 may be partitioned into virtual machines (e.g., virtual machine 652 and virtual machine 654). Physical machines can also concurrently run separate service applications. The virtual machines or physical machines can be configured as individualized computing environments that are supported by resources 660 (e.g., hardware resources and software resources) in cloud computing platform 610. It is contemplated that resources can be configured for specific service applications. Further, each service application may be divided into functional portions such that each functional portion is able to run on a separate virtual machine. In cloud computing platform 610, multiple servers may be used to run service applications and perform data storage operations in a cluster. In particular, the servers may perform data operations independently but exposed as a single device referred to as a cluster. Each server in the cluster can be implemented as a node.

Client device 680 may be linked to a service application in cloud computing platform 610. Client device 680 may be any type of computing device, which may correspond to computing device 600 described with reference to FIG. 6, for example, client device 680 can be configured to issue commands to cloud computing platform 610. In embodiments, client device 680 may communicate with service applications through a virtual Internet Protocol (IP) and load balancer or other means that direct communication requests to designated endpoints in cloud computing platform 610. The components of cloud computing platform 610 may communicate with each other over a network (not shown), which may include, without limitation, one or more local area networks (LANs) and/or wide area networks (WANs).

Example Computing Environment

Figure 7:
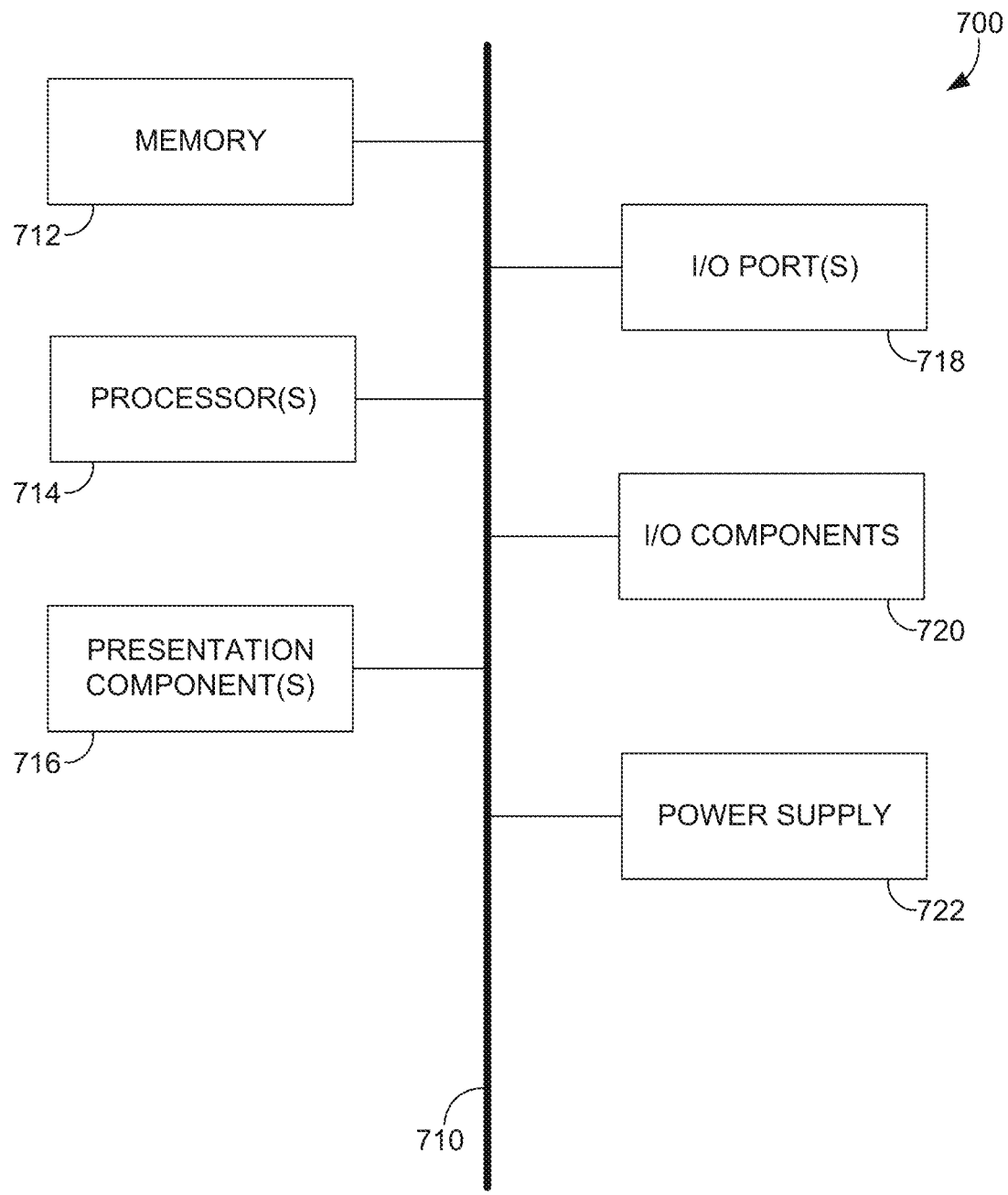
FIG. 7 is a block diagram of an exemplary computing environment suitable for use in implementing aspects of the technology described herein.

Having briefly described an overview of embodiments of the present invention, an example operating environment in which embodiments of the present invention may be implemented is described below in order to provide a general context for various aspects of the present invention. Referring initially to FIG. 7 in particular, an example operating environment for implementing embodiments of the present invention is shown and designated generally as computing device 700. Computing device 700 is but one example of a suitable computing environment and is not intended to suggest any limitation as to the scope of use or functionality of the invention. Neither should computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 7, computing device 700 includes bus 710 that directly or indirectly couples the following devices: memory 712, one or more processors 714, one or more presentation components 716, input/output ports 718, input/output components 720, and illustrative power supply 722. Bus 710 represents what may be one or more buses (such as an address bus, data bus, or combination thereof).

The various blocks of FIG. 7 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 7 is merely illustrative of an example computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

Additional Structural and Functional Features of Embodiments of the Technical Solution Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computerized system comprising:
one or more computer processors; and
computer memory storing computer-useable instructions that, when used by the one or more computer processors, cause the one or more computer processors to perform operations comprising:
generating, by the computerized system, a training data set, wherein generating the training data set comprises aggregating, by the computerized system at a crisis-recovery data analytics engine, a pre-crisis dataset and a crisis dataset associated with a set of variables representing a set of consumer behaviors;
training, by the computerized system, a crisis-recovery machine learning model based on the training data set, wherein training the crisis-recovery machine learning model comprises:
determining weights for the set of variables,
determining a linear combination of the set of variables based on the weights, wherein the linear combination represents a calculation of a consumer activity index corresponding to the set of variables, and wherein the consumer activity index represents a level of recovery from a crisis event;
reducing a dimensionality of the linear combination, wherein reducing the dimensionality of the linear combination comprises selecting a subset of the set of variables using principal component analysis to calculate the consumer activity index;
accessing, by the computerized system, a crisis-recovery dataset associated with the subset of variables;
generating, by the computerized system using the linear combination, the consumer activity index for each of several periods in time; and
based on the consumer activity index, generating, by the computer system, an interactive user interface for presentation to a user, wherein the interactive user interface comprises a data visualization of the subset of variables and a plot of the consumer activity index for each of the several periods in time.

2. The computerized system of claim 1, wherein training the crisis-recovery machine learning model comprises retraining the crisis-recovery machine learning model for a defined training window using a subset of the pre-crisis dataset and the crisis dataset to refine the set of consumer behaviors.

3. The computerized system of claim 1, wherein the pre-crisis dataset and the crisis dataset comprise:
mobility data representing a mobility change associated with a plurality of consumers, and
spending data representing spending change associated with the plurality of consumers.

4. The computerized system of claim 1, wherein the pre-crisis dataset comprises historical consumer activity data corresponding to a first time period prior to an anchor date, and wherein the crisis dataset comprises additional consumer activity corresponding to a second time period after the anchor date.

5. The computerized system of claim 1, wherein the crisis-recovery dataset is associated with geographic regions via hierarchy and granularity data of the crisis-recovery dataset.

6. The computerized system of claim 1, wherein generating the consumer activity index comprises anchoring the consumer activity index to an anchor date associated with the crisis event.

7. The computerized system of claim 1, wherein the weights represent loading factors of each of the variables of the set of variables.

8. The computerized system of claim 1, wherein the data visualization represents a first subset of variables of the set of variables that positively impact the consumer activity index and a second subset of variables of the set of variables that negatively impact the consumer activity index.

9. The computerized system of claim 1, wherein the data visualization represents at least two different periods in time and crisis-recovery data associated with each of the periods in time.

10. The computerized system of claim 1, wherein the data visualization represents a geographical region associated with a least two levels of hierarchy of a geographical region and crisis-recovery data associated with each of the levels of hierarchy of the geographical region.

11. The computerized system of claim 1, the operations further comprising:

generating a crisis baseline associated with the set of variables, wherein the crisis baselines is associated with an anchor date of the crisis event.

12. The computerized system of claim 11, wherein the data visualization represents the crisis recovery data that indicates recovery relative to the crisis baseline.

13. A method comprising:

generating, by a computerized system, a training data set, wherein generating the training data set comprises aggregating, by the computerized system at a crisis-recovery data analytics engine, a pre-crisis dataset and a crisis dataset associated with a set of variables representing a set of consumer behaviors;

training, by the computerized system, a crisis-recovery machine learning model based on the training data set, wherein training the crisis-recovery machine learning model comprises:

determining weights for the set of variables, determining a linear combination of the set of variables based on the weights, wherein the linear combination represents a calculation of a consumer activity index corresponding to the set of variables, and wherein the consumer activity index represents a level of recovery from a crisis event;

reducing a dimensionality of the linear combination, wherein reducing the dimensionality of the linear combination comprises selecting a subset of the set of variables using principal component analysis to calculate the consumer activity index;

accessing, by the computerized system, a crisis-recovery dataset associated with the subset of variables;

generating, by the computerized system using the linear combination, the consumer activity index for each of several periods in time; and based on the consumer activity index, generating, by the computerized system, an interactive user interface for presentation to a user, wherein the interactive user interface comprises a data visualization of the subset of variables and a plot of the consumer activity index for each of the several periods in time.

14. The method of claim 13, wherein training the crisis-recovery machine learning model comprises retraining the crisis-recovery machine learning model for a defined training window using a subset of the pre-crisis dataset and the crisis dataset to refine the set of consumer behaviors.

15. The method of claim 13, wherein the pre-crisis dataset and the crisis dataset comprise:

mobility data representing a mobility change associated with a plurality of consumers, and spending data representing spending change associated with the plurality of consumers.

16. The method of claim 13, wherein the pre-crisis dataset comprises historical consumer activity data corresponding to a first time period prior to an anchor date, and wherein the crisis dataset comprises additional consumer activity corresponding to a second time period after the anchor date.

17. The method of claim 13, wherein the crisis-recovery dataset is associated with geographic regions via hierarchy and granularity data of the crisis-recovery dataset.

18. The method of claim 13, wherein generating the consumer activity index comprises anchoring the consumer activity index to an anchor date associated with the crisis event.

19. The method of claim 13, wherein the weights represent loading factors of each of the variables of the set of variables.

20. One or more computer-storage media having computer-executable instructions embodied thereon that, when executed by a computerized system having a processor and memory, cause the computerized system to perform operations comprising:

generating a training data set, wherein generating the training data set comprises aggregating, by the computerized system at a crisis-recovery data analytics engine, a pre-crisis dataset and a crisis dataset associated with a set of variables representing a set of consumer behaviors;

training a crisis-recovery machine learning model based on the training data set, wherein training the crisis-recovery machine learning model comprises:

determining weights for the set of variables, determining a linear combination of the set of variables based on the weights, wherein the linear combination represents a calculation of a consumer activity index corresponding to the set of variables, and wherein the consumer activity index represents a level of recovery from a crisis event;

reducing a dimensionality of the linear combination, wherein reducing the dimensionality of the linear combination comprises selecting a subset of the set of variables using principal component analysis to calculate the consumer activity index;

accessing a crisis-recovery dataset associated with the subset of variables;

generating, using the linear combination, the consumer activity index for each of several periods in time; and based on the consumer activity index, generating an interactive user interface for presentation to a user, wherein the interactive user interface comprises a data visualization of the subset of variables and a plot of the consumer activity index for each of the several periods in time.

* * * * *